(12) United States Patent
Chen

(10) Patent No.: US 9,862,086 B2
(45) Date of Patent: Jan. 9, 2018

(54) METHOD OF MANUFACTURING MULTICOLORED HAND TOOL GRIPS

(71) Applicant: Hsiu-Man Yu Chen, Taichung (TW)

(72) Inventor: Hsiu-Man Yu Chen, Taichung (TW)

( * ) Notice: Subject to any disclaimer, the term of this patent is extended or adjusted under 35 U.S.C. 154(b) by 317 days.

(21) Appl. No.: 14/622,699

(22) Filed: Feb. 13, 2015

(65) Prior Publication Data

US 2016/0236384 A1 Aug. 18, 2016

(51) Int. Cl.
| | | |
|---|---|---|
| *B29C 45/16* | (2006.01) | |
| *B29C 45/26* | (2006.01) | |
| *B25G 1/10* | (2006.01) | |
| *B29C 45/00* | (2006.01) | |
| *B29L 31/46* | (2006.01) | |

(52) U.S. Cl.
CPC ............ *B25G 1/10* (2013.01); *B29C 45/0062* (2013.01); *B29C 45/2673* (2013.01); *B29C 2791/001* (2013.01); *B29K 2995/0021* (2013.01); *B29L 2031/463* (2013.01)

(58) Field of Classification Search
CPC ... B25G 1/10; B29C 45/2673; B29C 45/0062; B29C 2791/001; B29K 2995/0021; B29L 2031/463
USPC ......... 264/294, 297.2, 299, 320, 328.1, 248, 264/249, 250, 251, 255, 263
See application file for complete search history.

(56) References Cited

U.S. PATENT DOCUMENTS

| | | | | |
|---|---|---|---|---|
| 5,662,946 | A * | 9/1997 | Pratt ................... | B29C 45/2673 425/190 |
| 7,858,013 | B2 * | 12/2010 | Izumo ................. | B29C 45/1635 264/250 |
| 2008/0289980 | A1 * | 11/2008 | Johnston ............. | B29C 33/3828 206/307 |
| 2009/0166931 | A1 * | 7/2009 | Liu ................... | B29C 45/14778 264/447 |
| 2013/0107347 | A1 * | 5/2013 | Chau .................... | G02B 6/3546 359/290 |
| 2013/0202731 | A1 * | 8/2013 | Liu ....................... | B29C 45/332 425/556 |

* cited by examiner

*Primary Examiner* — Nahida Sultana

(74) *Attorney, Agent, or Firm* — Ming Chow; Sinorica, LLC

(57) ABSTRACT

A method of manufacturing a multi-colored hand tool grip includes a step of forming a grip, a step of forming a lid and a step of completing a finished product. In the step of forming a lid, replaceable submodules are employed to form the lid, able to lower cost of mold making. In the step of completing a finished product, after the grip and the lid are combined together and received in the mold cavity of a third mold set, raw material of a holding portion is poured into the mold cavity to form a different-colored holding portion. By so designing, the lid and the holding portion of different colors can be formed on the grip to let patterns presented more clearly, thus forming a multi-colored hand tool grip.

9 Claims, 18 Drawing Sheets

METHOD OF MANUFACTURING MULTICOLORED HAND TOOL GRIPS

BACKGROUND OF THE INVENTION

1. Field of the Invention

This invention relates to a method of manufacturing a hand tool grip.

2. Description of the Prior Art

A conventional hand tool grip is formed with a plastic injection molded handle that has its outer circumferential edge fitted with a plastic foamed sleeve so that the handle can be held comfortably. For making the trademarks, the characters or labels of a hand tool grip conspicuous, the inventor of this invention researched and developed a hand tool grip, which includes a grip 1, a lid 2 and an elastic cladding layer 3 combined together, as shown in FIGS. 1 and 2. The lid 2 has one side provided with a recessed window 4 and a front side bored with a plurality of hollowed-out grooves 5 filling the elastic cladding layer 3 for showing a pattern to let the hand tool grip produce double-color effects and show patterns for making characters or labels of the trademarks conspicuous.

However, for forming characters or labels of all sorts of trademarks on a hand tool grip, various molds for forming the lids 2 with different trademarks have to be made first and then, the lids 2 with different trademarks have to be injection molded. Since sizes, shapes and cambers of various kinds of hand tool grips and corresponding lids are different; therefore, cost of mold making will be increased. In addition, for producing a hand tool grip with more than two colors, the shaping molds have to be further provided with a plurality of pouring holes and pouring grooves for pouring in different-colored raw materials, thus enhancing manufacturing cost of the hand tool grip. In view of this condition, the inventor of this invention thinks deeply and has accumulated much experience in researching and developing related appliances and hence devises this invention.

SUMMARY OF THE INVENTION

This invention is devised to offer a method of manufacturing a multi-colored hand tool grip. A lid to be combined with a grip can be injection molded by employing replaceable submodules for reducing cost of mold making, and the lid and a holding portion of different colors can be formed on the grip, thus, forming a multi-colored hand tool grip.

The method of manufacturing a multi-colored hand tool grip includes a step of forming a grip, a step of forming a lid and a step of completing a finished product. A first mold set is provided for injection molding a grip and formed with a grip cavity, and raw material of a grip is poured into the grip cavity to be solidified therein to form the grip. A second mold set is provided for forming a lid, composed of a third mold board, a fourth mold board and a plurality of submodules. The third mold board and the fourth mold board can be closely pressed against each other to define a lid cavity. The third mold board is formed with at least one combining groove, and the number of the first submodules is more than that of the first combining grooves. Each first submodule is formed with a first pattern surface having a first pattern provided thereon. The first combining grooves of the third mold board can be employed for optionally installing one of the first submodules, letting the inner wall surface of the third mold board and the first pattern surface of the first submodule are positioned at the same plane and have the first pattern exposed. Then, raw material of a lid is poured into the lid cavity to have the raw material solidified to form a lid, which is formed with a pattern layer at a location corresponding to the first pattern of the first pattern surface of the first submodule. A third mold set for completing a finished product is composed of a fifth mold board and sixth mold board, which can be tightly pressed against each other to define a mold cavity. After the lid is combined with the grip and received in the mold cavity, raw material of a holding portion is poured into the mold cavity to have the raw material solidified on the outer circumference of the grip to form a holding portion and also form a third pattern between the pattern layers of the lid, thus completing a finished product.

The method of manufacturing a multi-colored hand tool grip in the present invention is to have the first combining grooves of the third mold board optionally installing the first submodules to form different-colored lids for reducing cost of mold making. Subsequently, the lid and the holding portion of different colors are injection molded on the grip by using different-colored raw materials, thus forming a multi-colored hand tool grip.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
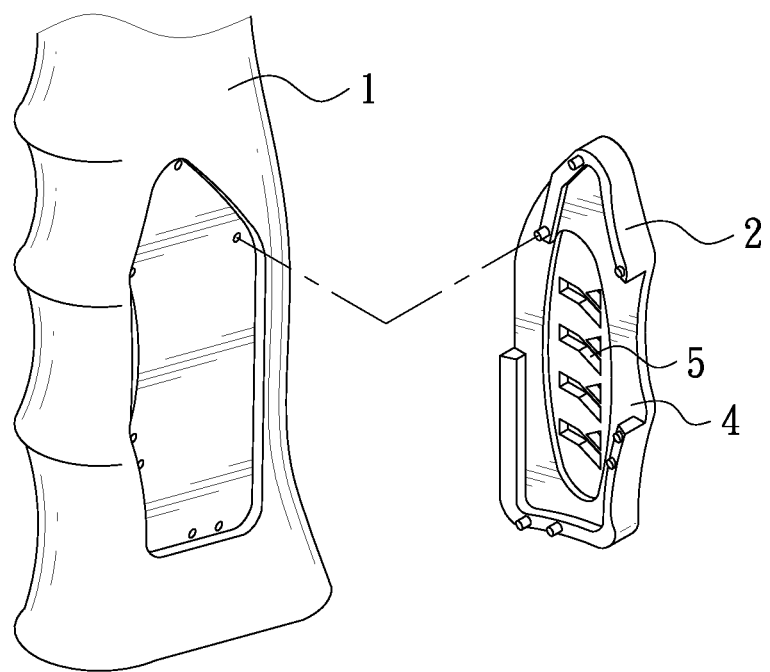
FIG. 1 is an exploded perspective view of a conventional hand tool grip.
Figure 2:
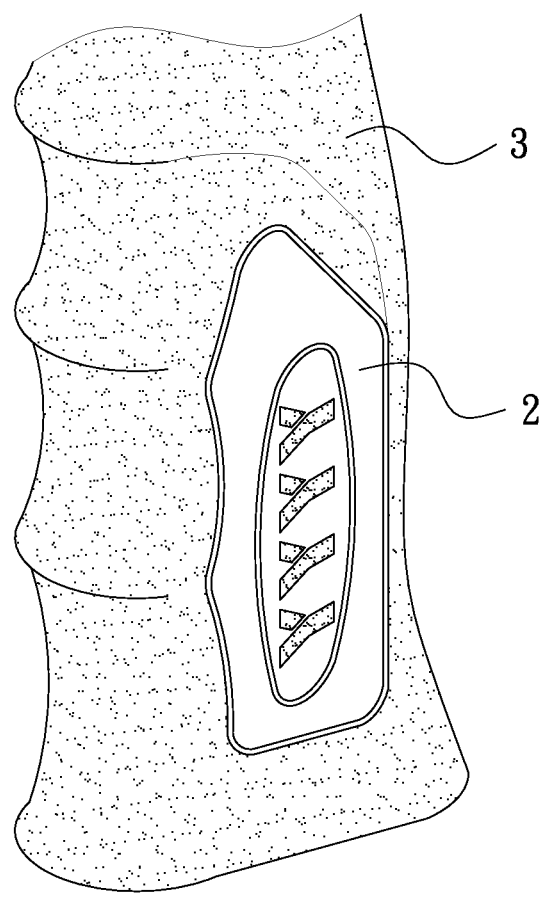
FIG. 2 is a schematic view of a finished product of the conventional hand tool grip.
Figure 3:
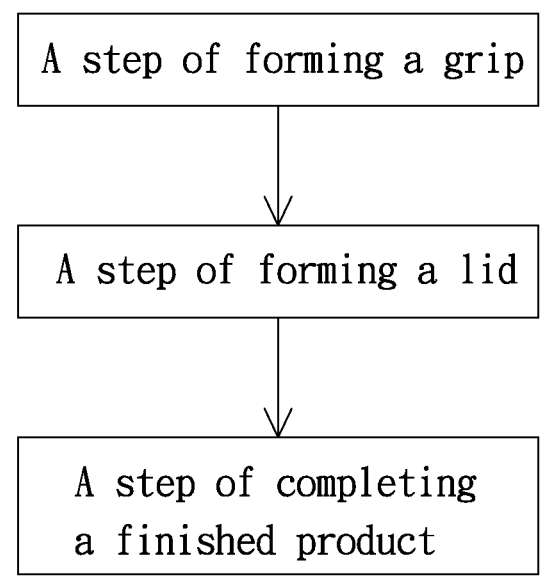
FIG. 3 is a flow chart of manufacturing a multi-colored hand tool grip in the present invention.
Figure 4:
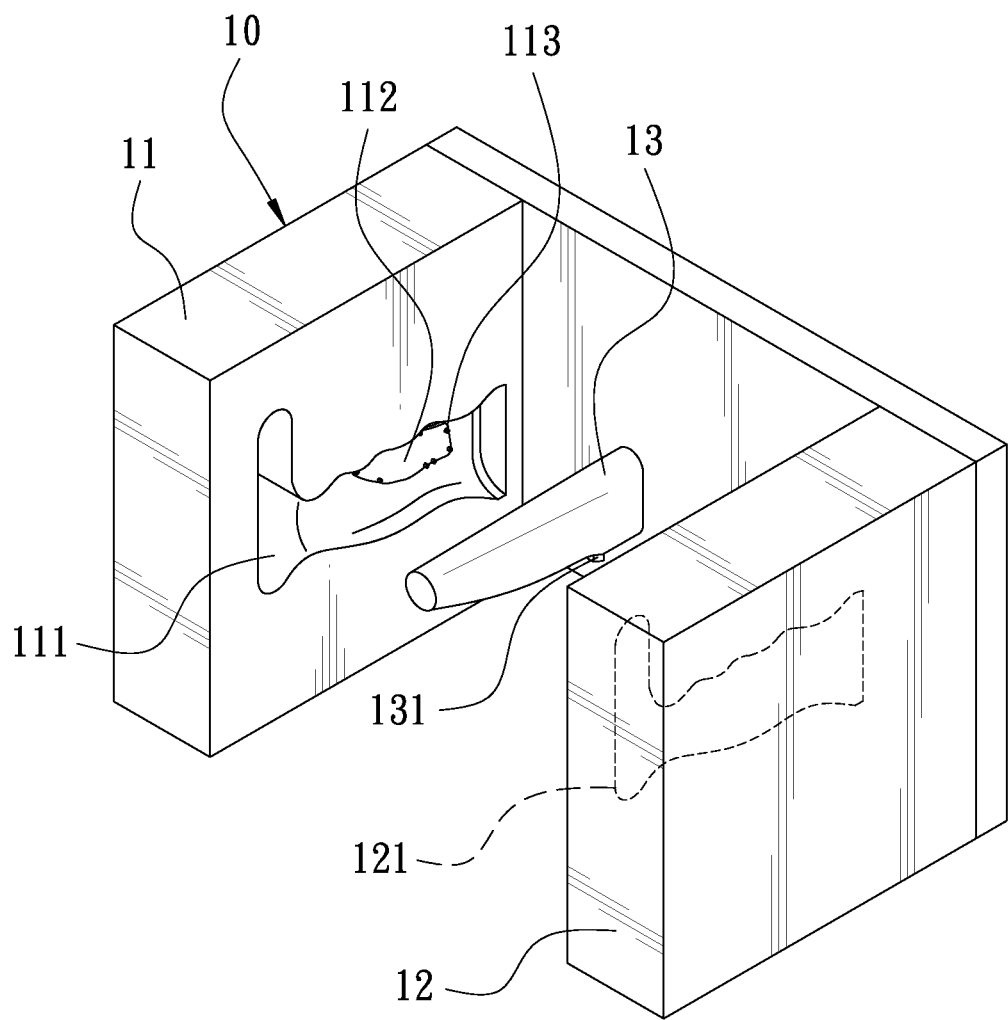
FIG. 4 is a perspective view of a first preferred embodiment of a first mold set in the present invention.
Figure 5:
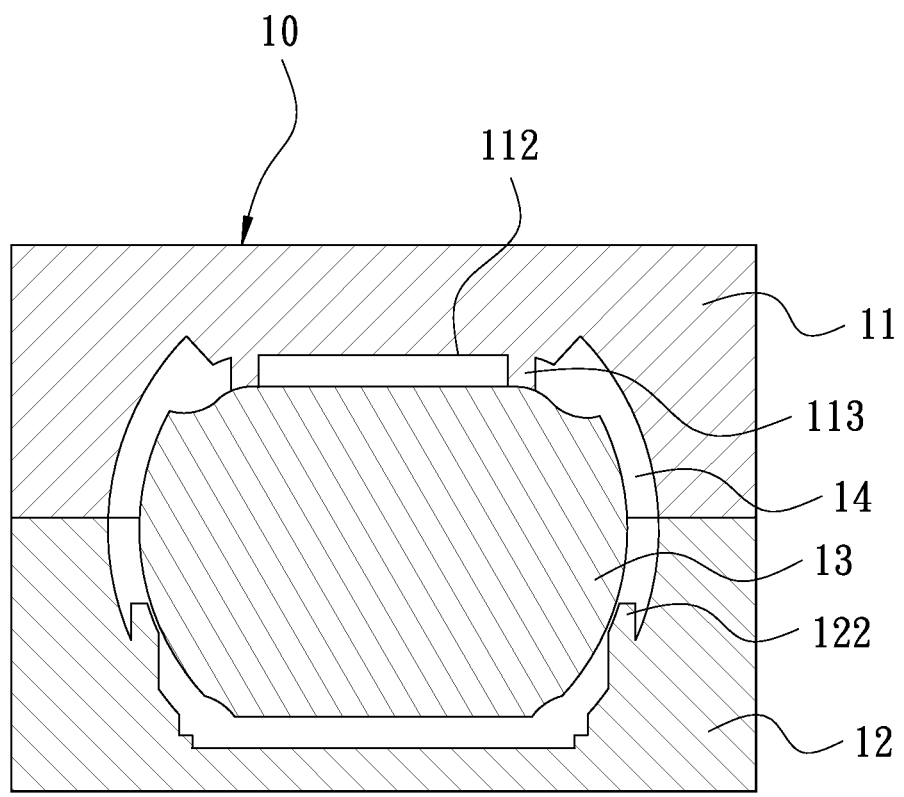
FIG. 5 is across-sectional view of the first preferred embodiment of the first mold set in the present invention.
Figure 6:
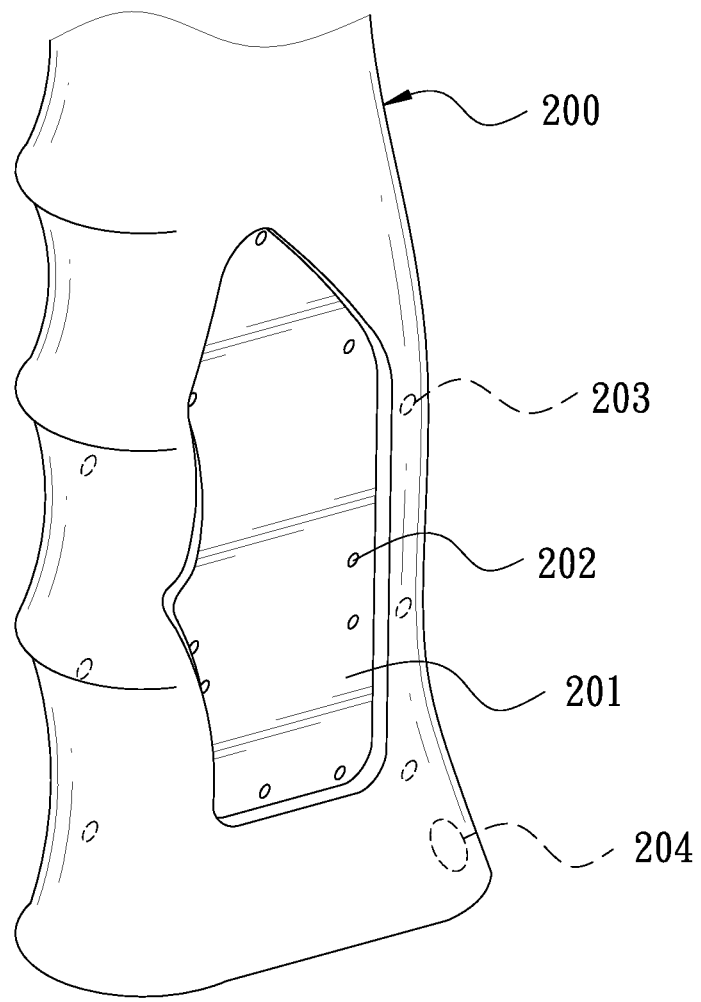
FIG. 6 is perspective view of the first preferred embodiment of a grip in the present invention.

A first preferred embodiment of a method of manufacturing a multicolored hand tool grip in the present invention, referring to FIG. 3, includes the following steps:

A step of forming a grip: Referring to FIGS. 4-6, a first mold set 10 is provided to form a grip, composed of a first mold board 11, a second mold board 12 and a core 13. The first mold board 11 and the second mold board 12 are provided oppositely and can be tightly pressed against each other to define a grip cavity 14, and the core 13 is positioned between the grip cavities 14. After the first mold board 11 and the second mold board 11 are closely pressed against each other, raw material of a grip, which is TPA plastic material in this invention, is poured into the grip cavity 14 to have the raw material solidified to form a grip 200. In this preferred embodiment, the first mold board 11 is formed with a recessed mold surface 111 provided with a projecting edge 112 having a plurality of first projections 113 disposed thereon. The second mold board 12 is formed with a second mold surface 121 formed thereon with a plurality of second projections 122, and the core 13 is axially provided with a projecting block 131 and the surface of the core 13 can be connected with both the first mold surface 111 and the second mold surface 121. After being injection molded, the grip 200 will form a receiving groove 201 and a plurality of first recessed holes 202 at locations respectively corresponding to the projecting edge 112 and the first projections 113 of the first mold board 11, and will form a plurality of second recessed holes 203 at locations corresponding to the second projections 121 of the second mold board 12 and further form a pouring hole 204 at a location corresponding to the projecting block 131 of the first core 13.

Figure 7:
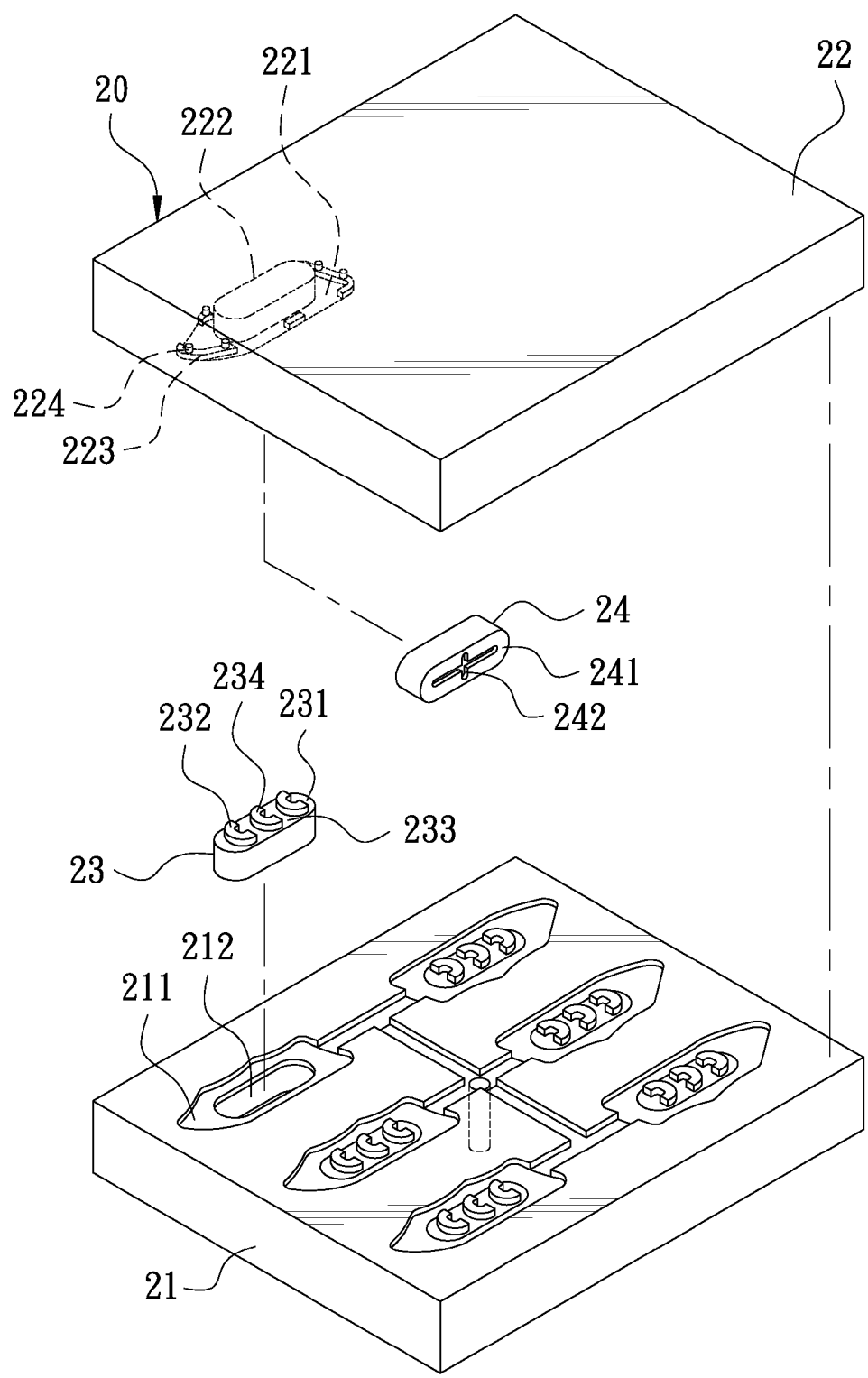
FIG. 7 is perspective view of the first preferred embodiment of a second mold set in the present invention.
Figure 8:
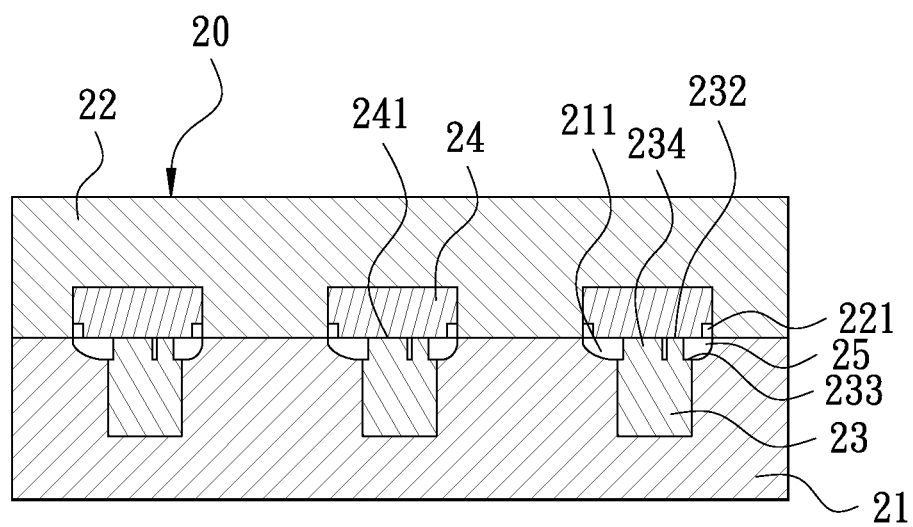
FIG. 8 is a cross-sectional view of the first preferred embodiment of the second mold set in the present invention.
Figure 9:
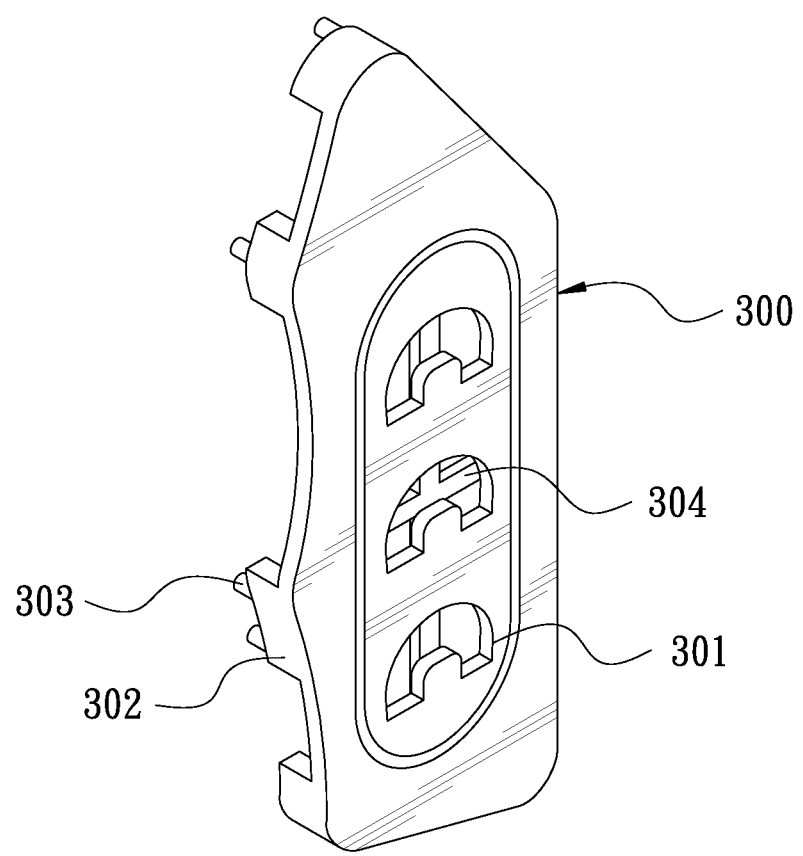
FIG. 9 is a perspective view of the first preferred embodiment of a lid in the present invention.
Figure 10:
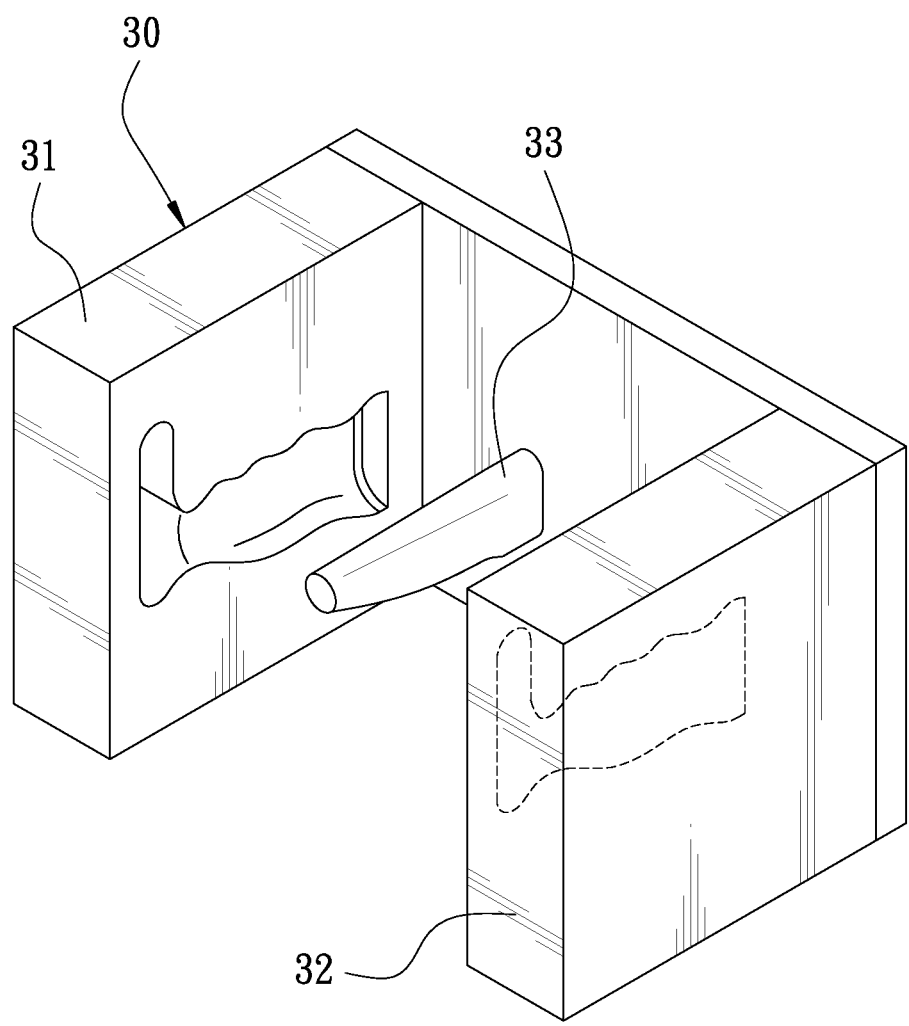
FIG. 10 is a perspective view of the first preferred embodiment of a third mold set in the present invention.
Figure 11:
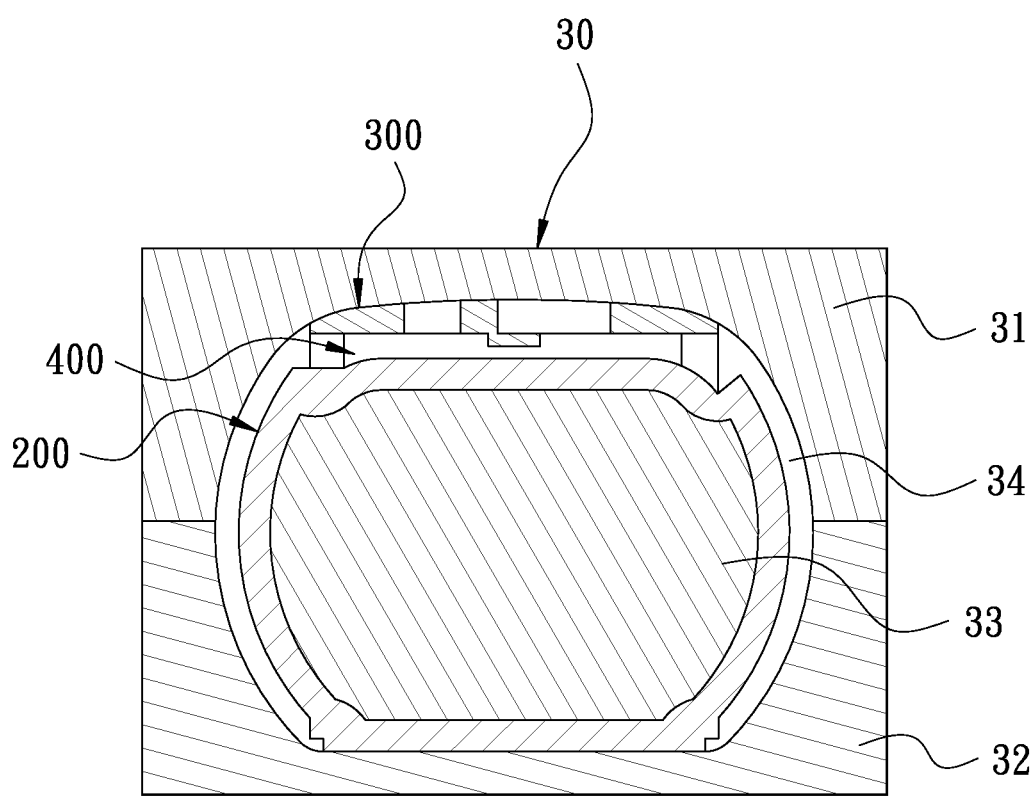
FIG. 11 is a cross-sectional view of the first preferred embodiment of the third mold set in the present invention.
Figure 12:
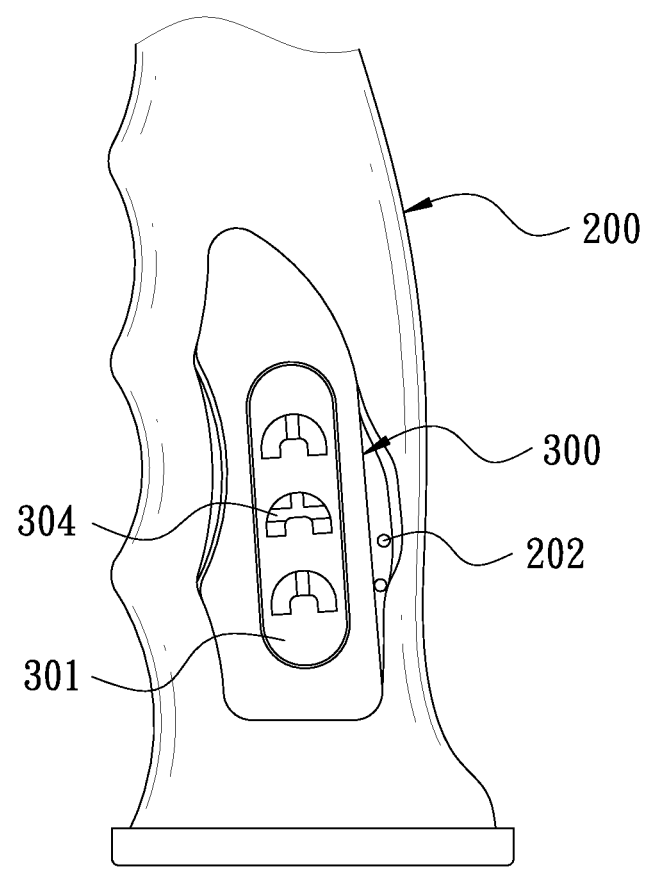
FIG. 12 is a perspective view of the first preferred embodiment of the lid combined together with the grip in the present invention.
Figure 13:
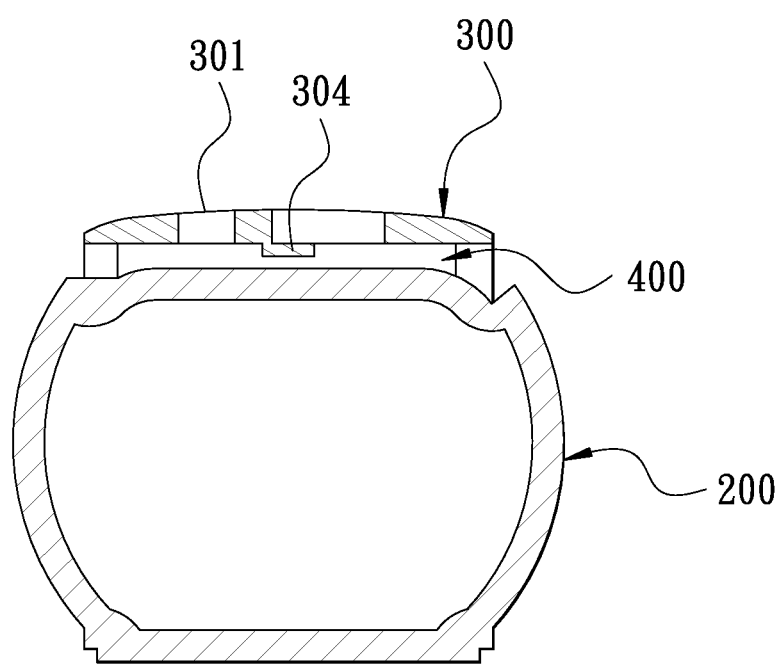
FIG. 13 is a cross-sectional view of the first preferred embodiment of the combination of the lid and the grip in the present invention.

A step of forming a lid: Referring to FIGS. 7-9. a second mold set 20 is provided for shaping a lid, consisting of a third mold board 21, a fourth mold board 22, a plurality of first submodules 23 and second submodules 24. The third mold board 21 and the fourth mold board 22 are provided oppositely and can be closely combined together to form a lid cavity 25. The third mold board 21 is formed with plural recessed third mold surfaces 211, which is provided with plural first combining groove 212, and the first submodules 23 are respectively formed with a first pattern surface 231 having a first pattern 232 provided thereon. In this preferred embodiment, the first pattern 232 protrudes out of the first pattern surface 231 of the first submodule 23 and is composed of plural recesses 233 and plural projections 234, and the space between every two projections is more than 0.5 mm. The first combining grooves 212 of the third mold board 21 can be employed for optionally installing the first submodule 23, letting the third mold surface 211 of the third mold board 21 connect with the first pattern surface 231 of the first submodule 23 and having the first pattern 232 exposed. The fourth mold board 22 is formed with plural recessed mold surfaces 221, which are respectively provided with plural recessed second combining grooves 222 and plural recessed grooves 223 at the outer circumference of the second combining groove 222 of the fourth mold surface 221. The recessed groove 223 has the bottom bored with plural third recessed holes 224, and the number of the third recessed holes 224 is less than that of the first recessed holes 202. The second submodule 24 is formed with a second pattern surface 241 having a second pattern 242 formed thereon. In this invention, the second pattern 242 is plural recessed grooves. The second combining groove 222 of the fourth mold board 22 can be used for optionally installing the second submodules 24, letting the inner wall surface of the fourth mold board 22 connect with the second pattern surface 241 of the second submodule 24 and having the second pattern 242 exposed. When the third mold board 21 and the fourth mold board 22 are closely pressed against each other, the topside of the first pattern 232 and the second pattern surface 241 are conplane and then, raw material of a lid, which is TPA plastic material, is poured into the lid cavity 25 to have the raw material solidified to form a lid 300. After injection molded, the lid 300 is formed with a pattern layer 301 penetrating the lid 300 at a location corresponding to the first pattern 232 of the first pattern surface 231 of the first submodule 23 and formed with plural insert plates 302 and plural insert projections 303 at locations corresponding to the recessed grooves 223 and the third recessed holes 224 of the fourth mold board 22 and further formed with plural support pieces 304 at locations corresponding to the second pattern 242 of the second pattern surface 241 of the second submodule 24. The support piece 304 can be a support rib, and the underside of the pattern layer 301 and the topside of the support rib 302 are conplane.

A step of completing a finished product: Referring to FIGS. 10-14 and FIGS. 6-9, a third mold set 30 is provided to complete a finished product, containing a fifth mold board 31, a sixth mold board 32 and a second core 33. The fifth mold board 31 and the sixth mold board 32 are provided oppositely and can be closely combined together to define a mold cavity 34, which is larger than the grip cavity 14 in volume, and the second core 33 is positioned in the mold cavity 34. Subsequently, the lid 300 is mounted with the receiving groove 201 of the grip 200 to have the outer circumferential wall of the insert plate 302 aligned to the inner circumferential wall of the receiving groove 201 and then have the insert projections 303 respectively inserted in the first recessed holes 202 of the grip 200, thus having the lid 300 combined with the grip 200 and also forming a pattern layer cavity 400 between the grip 200 and the lid 300 and then, the grip 200 is fitted on the second core 33. When the fifth mold board 31 and the sixth mold board 32 are tightly pressed against each other to have the pattern layer cavity 400 communicating with the mold cavity 34, raw material of a holding portion, which is thermoplastic rubber, is poured into both the mold cavity 34 and the pattern layer cavity 400 through the pouring hole 204 to have the outer circumference of the grip 200 forming a holding portion 500 and the pattern layer of the lid 300 forming a third pattern 501, and the holding portion 500 is firmly combined with the second recessed holes 203 of the grip 200, thus completing a finished product.

Referring to FIGS. 3-14, as can be understood from above description, the step of forming a grip is to have the first mold set 10 forming the grip 200, which is formed with the receiving groove 201, the first recessed holes 202, the second recessed holes 203 and the pouring hole 204. The step of forming a lid is to have the second mold set 20 injection molding the lid 300, which is formed with the pattern layer 301, the insert plates 302, the insert projections 303 and the support pieces 304, and the last step of completing a finished product is first to have the lid 300 combined with the grip 200 and then have the holding portion 500 injection molded around the grip 200 by means of the third mold set 30, thus finishing manufacturing a multicolored hand tool grip.

Referring to FIGS. 7-9, one the special features of this invention is that, in the step of forming a lid, the first submodule 23 can first be optionally installed in the first combining groove 212 of the third mold board 21, and the second submodule 24 can optionally be installed in the second combining groove 222 of the fourth mold board 22. Thus, the pattern layer 301 of the lid 300 can be formed via the first submodule 23, the pattern layer 30 being characters, drawings, labels or trademarks, and the support ribs 304 of the lid 200 can be formed through the second submodule 24. By so designing, the lid 300 with all sorts of pattern layers 301 can be formed by optionally making use of the first submodules 23 and the second submodules 24 and thus, cost of making molds can be reduced and additionally, the first submodules 23 and submodules 24 can also be applied to other grip molds or hand tool molds for lessening number of molds and lowering cost of mold making.

Figure 14:
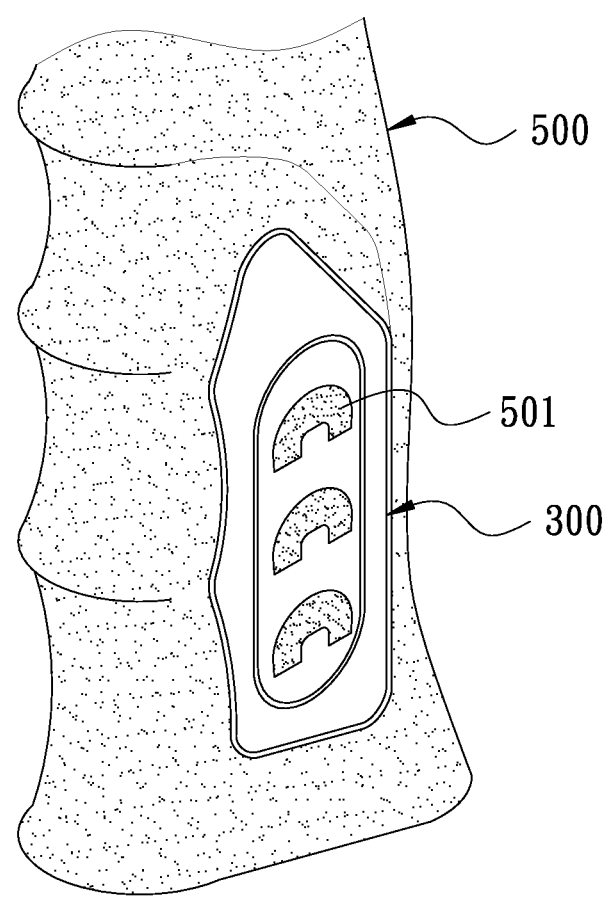
FIG. 14 is a perspective view of the first preferred embodiment of a finished product of a multi-colored hand tool grip in the present invention.

Referring to FIGS. 7, 8 and 14, the technical characteristic of keeping the topside of the first pattern 232 and the second pattern surface 241 at the same plane enables the underside of the pattern layer 301 of the lid 300 and the topside of the support piece 304 to be conplane, thus letting the third drawing 501 become more substantial and integrated. In addition, since a space more than 0.5 mm is formed between the projecting members 234 of the first pattern 232; therefore, during injection molding, the spaces of the projecting members 234 enable raw material of the holding portion to be completely poured into the recesses of the lid 300, thus, making the pattern 501 comparatively clear and complete.

Referring to FIGS. 6, 7, 9 and 14, since the number of the third recessed holes 224 of the recessed grooves 223 are less than that of the first recessed holes 202; therefore, after injection molding, the number of the insert projections 303 of the lid 300 is less than that of the first recessed holes 202. By so designing, raw material of the holding portion can be poured into both the superfluous first recessed holes 202 and the second recessed holes 203 of the grip 200 and thus, the holding portion 500 can be stably covered on both the grip 200 and the lid 300.

Figure 15:
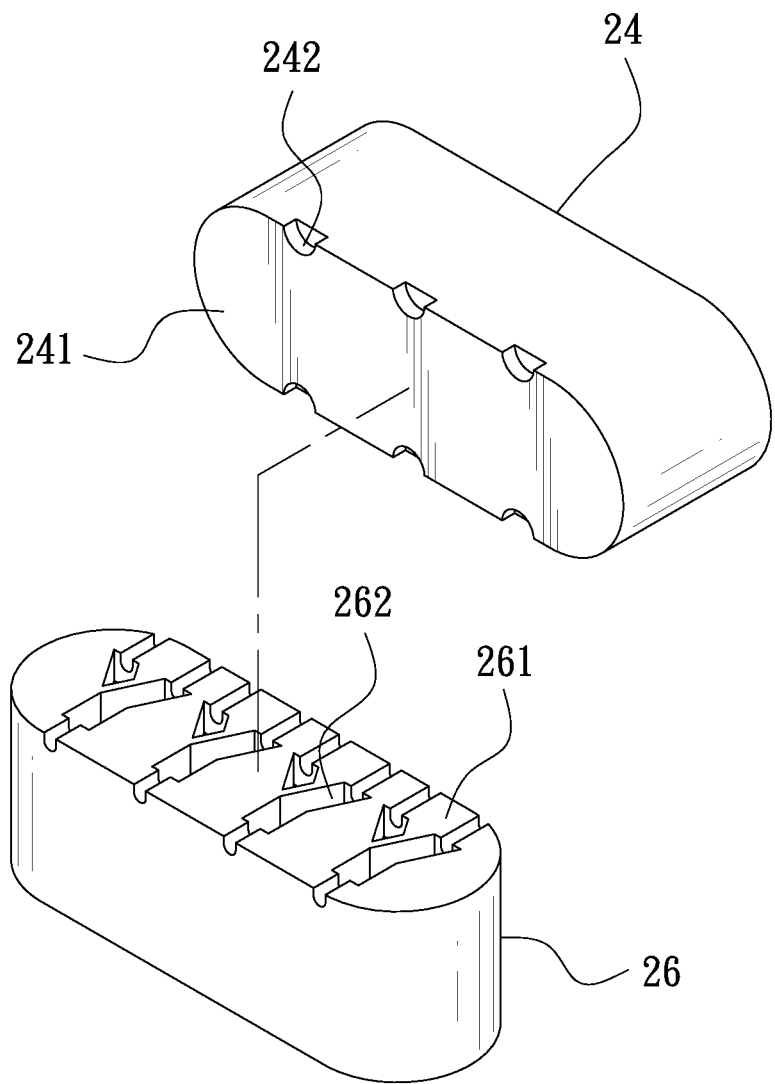
FIG. 15 is perspective views of a second preferred embodiment of a first submodule and a second submodule in the present invention.
Figure 16:
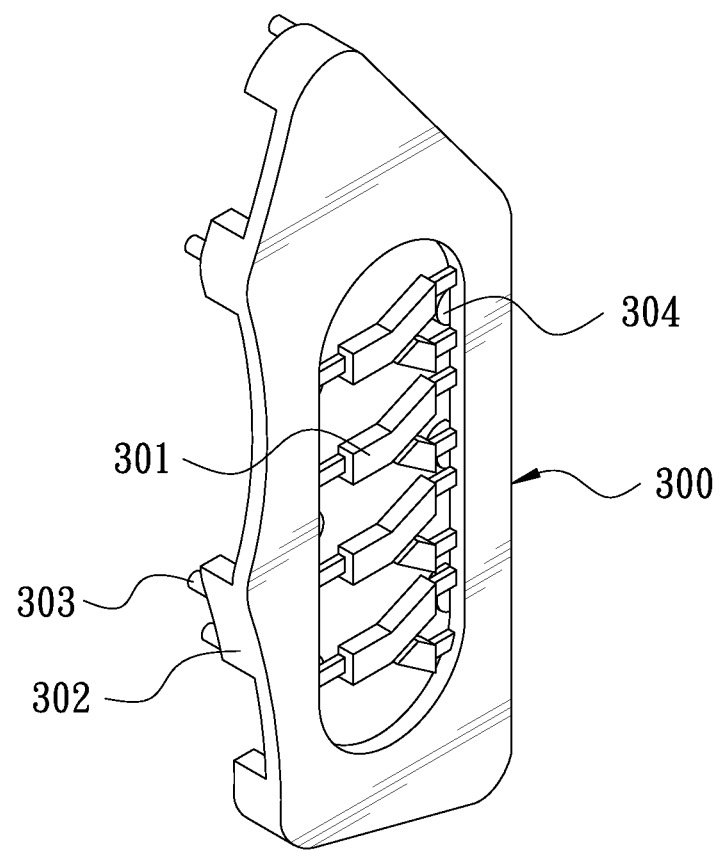
FIG. 16 is a perspective view of the second preferred embodiment of a lid in the present invention.

A second preferred embodiment of a method of manufacturing a multi-colored hand tool grip in the present invention, as shown in FIGS. 15 and 16, is almost the same as that of the first preferred embodiment, except that, in the step of forming a lid, the first pattern 262 is recessed and formed on the first pattern surface 261 of the first submodule 26 so that when the lid 300 is injection molded, the lid 300 can form an impending pattern layer 301. Thus, when the holding portion 500 is injection molded, the circumferential side of the pattern layer of the lid 300 will form a bottom color that is the same as the color of the holding portion 500, letting the third pattern 501 presented clearly and completely.

Figure 17:
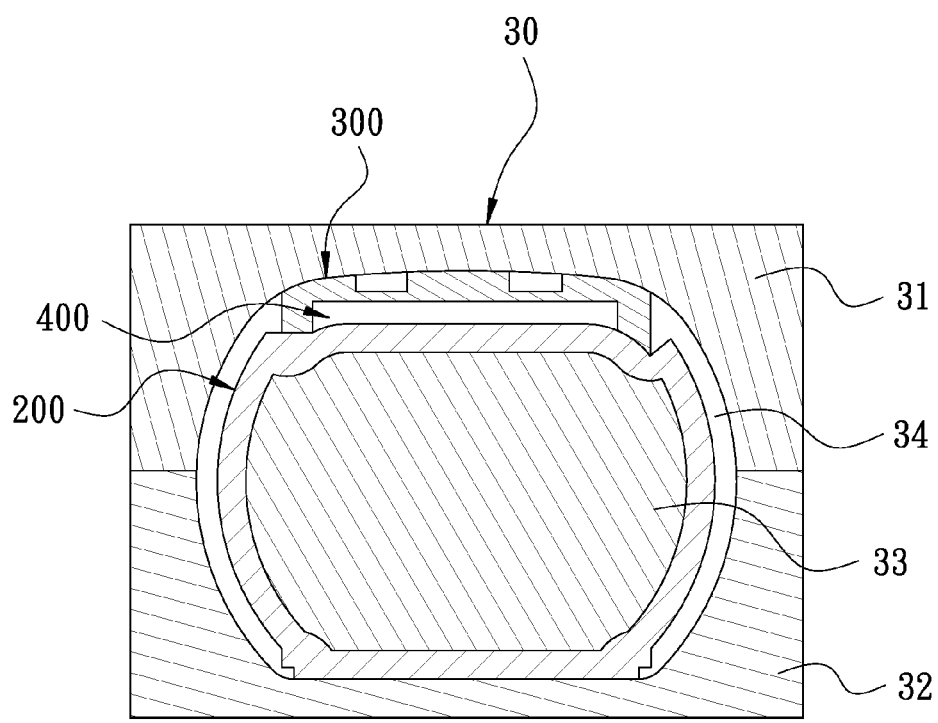
FIG. 17 is a cross-sectional view of a third preferred embodiment of combination of a lid and a grip in the present invention.
Figure 18:
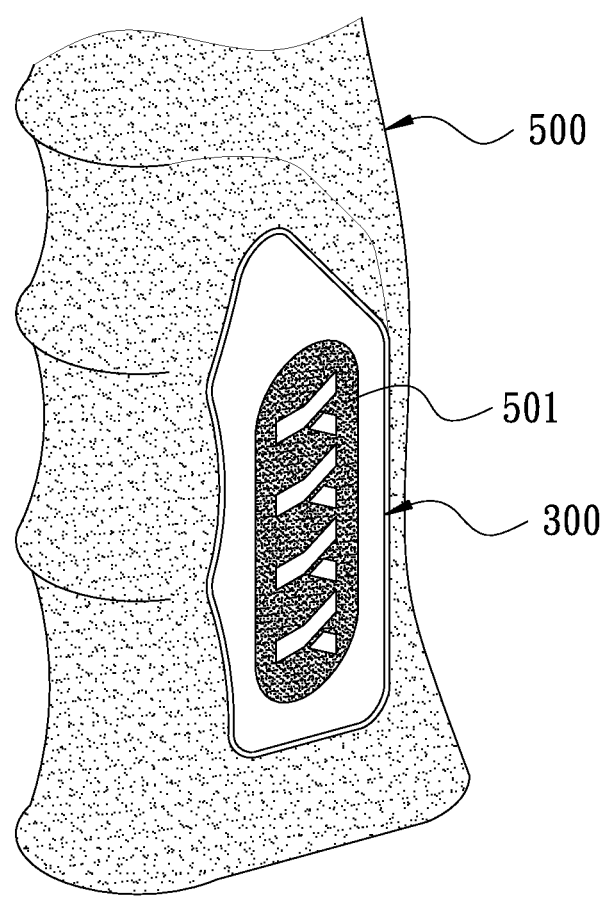
FIG. 18 is a perspective view of the third preferred embodiment of a finished product of a multi-colored hand tool grip in the present invention.

A third preferred embodiment of a method of manufacturing a multi-colored hand tool grip in the present invention, as shown in FIGS. 17 and 18, is almost the same as that of the first preferred embodiment, except that, in the step of completing a finished product, after the lid 300 is combined with the grip 200, the lid 300 has its circumferential side closely pressed against the grip 200 and an independent and sealed pattern cavity 400 is formed between the grip 200 and the lid 300. After raw material of a pattern layer is poured into the pattern layer cavity 400, the raw material of the pattern layer will be solidified in the pattern layer cavity 400 to form a pattern layer, thus forming a pattern whose color is different from that of the holding portion 500.

The characteristics and advantages of this invention are stated as follows:

The method of manufacturing a multi-colored hand tool grip in the present invention is first to have the first combining grooves 212 of the third mold board 21 optionally installing the first submodules 23 for injection molding the lid 300 with different patterns, able to lowering cost of mold marking. Then, raw materials of different colors for forming the lid and the holding portion are used for injection molding the different-colored lid 300 and the holding portion 500 on the grip 200, thus forming a multi-colored hand tool grip.

While the preferred embodiments of the invention have been described above, it will be recognized and understood that various modifications may be made therein and the appended claims are intended to cover all such modifications that may fall within the spirit and scope of the invention.

What is claimed is:

1. A method of manufacturing a multi-colored hand tool grip comprising:

forming a grip, a first mold set being provided for forming the grip, the first mold set comprising a first mold board and a second mold board, the first mold board and the second mold board being able to be tightly pressed against each other to define a grip cavity, a raw material being poured into the grip cavity to be solidified to form the grip;

forming a lid, a second mold set being provided for forming the lid, the second mold set comprising a third mold board, a fourth mold board and a plurality of first submodules, the third mold board and the fourth mold board being able to be closely pressed against each other to define a lid cavity, the third mold board comprising at least one first combining groove, number of the first submodules being more than that of the first combining grooves, each of the plurality of first submodules comprising a first pattern surface, the first pattern surface comprising a first pattern formed thereon, the first combining grooves of the third mold board being able to accommodate one of the first submodules, an inner wall surface of the third mold board and the first pattern surface of the at least one of the plurality of first submodules being positioned at the same plane and rendering the first pattern exposed, then, a raw material of the lid poured into the lid cavity, the raw material being solidified to form the lid, the lid forming a pattern layer at a location corresponding to the first pattern of the first pattern surface of the first submodule; and completing a finished product, a third mold set being provided for producing the finished product, the third mold set comprising a fifth mold board and a sixth mold board, the fifth mold board and the sixth mold board being able to be closely resisted against each other to define a mold cavity, the lid combined with the grip and together received in the mold cavity, a raw material of a holding portion being poured into the mold cavity, the raw material of the holding portion being solidified to form the holding portion around an outer circumference of the grip and further form a third pattern between the pattern layers of the lid;

by employing different-colored raw materials of the lid and the holding portion, the lid and the holding portion of different colors being able to be combined on the grip, thus forming a multi-colored hand tool grip; and in the step of forming the lid, the fourth mold board comprising at least one second combining groove and the second mold set comprising a plurality of second submodules, the at least one of the plurality of second submodules respectively comprising a second pattern surface, the second pattern surface being formed thereon with at least one second pattern, the at least one second combining groove of the fourth mold board being able to be used for accommodating the second submodules, the fourth mold board comprising an inner wall surface connecting with the second pattern surface of the second submodule and rendering the second pattern exposed, the lid forming at least one support piece at a location corresponding to the second pattern when the lid is injection molded.

2. The method of manufacturing a multi-colored hand tool grip as claimed in claim 1, wherein, in the step of forming the lid, the first pattern is protrudingly formed on the first pattern surface of the at least one of the plurality of first submodules, a pattern layer penetrating the lid is able to be formed via the first pattern when the lid is injection molded.

3. The method of manufacturing a multi-colored hand tool grip as claimed in claim 1, wherein, in the step of forming the lid, the first pattern is recessed and formed on the first pattern surface of the at least one of the first submodules, an impending pattern layer of the lid is able to be formed via the first pattern when the lid is injection molded.

4. The method of manufacturing a multi-colored hand tool grip as claimed in claim 1, wherein a topside of the first pattern and the second pattern surface are at the same plane and hence an underside of the pattern layer and a topside of the support piece of the lid able to be conplane when the lid is injection molded, in the step of completing the finished product, an underside of the third pattern and a topside of the support piece are able to be conplane.

5. The method of manufacturing a multi-colored hand tool grip as claimed in claim 1, wherein, in the step of forming the lid, the first pattern of the first pattern surface contains plural recesses and projections, and an interval between every two the projections is more than 0.5 mm.

6. The method of manufacturing a multi-colored hand tool grip as claimed in claim 1, wherein. in the step of completing the finished product, a pattern layer cavity is formed between the grip and the lid after the lid and the grip are combined together, raw material of pattern layer poured into the pattern layer cavity to be solidified therein to form a pattern layer.

7. The method of manufacturing a multi-colored hand tool grip as claimed in claim 6, wherein, in the step of completing the finished product, the pattern layer cavity communicates with the mold cavity.

8. The method of manufacturing a multi-colored hand tool grip as claimed in claim 1, wherein, in the step of forming the grip, the first mold set is provided with a first core and the first mold board is formed with a recessed mold surface, the first mold surface is provided thereon with a projecting edge, the projecting edge is formed thereon with a plurality of projections, the second mold board is formed with a second mold surface, the second mold surface is disposed with plural second projections, the first core axially is provided with a projecting block, surface of the projecting block is able to connect with both the first mold surface and the second mold surface, the grip forming a receiving groove and plural first recessed holes at locations corresponding to the projecting edge and the first projections of the first mold board when the grip is injection molded, the grip forming plural second recessed holes at locations corresponding to the second projections of the second mold board, the grip further forming a pouring hole at a location corresponding to the projecting block, in the step of completing the finishing product, the third mold set is formed with a second core, the second core positioned in the mold cavity, the mold cavity is larger than the grip cavity in volume, the grip fitted on the second core.

9. The method of manufacturing a multi-colored hand tool grip as claimed in claim 8, wherein the fourth mold board is provided with at least one recessed fourth mold surface, the fourth mold surface is formed with plural recessed grooves, the plural recessed grooves having their bottoms respectively bored with at least one recessed hole, number of the recessed holes is less than that of the first recessed holes.

* * * * *